(12) United States Patent
Tichelaar et al.

(10) Patent No.: US 11,084,267 B2
(45) Date of Patent: Aug. 10, 2021

(54) METHOD TO PRODUCE A LAMINATED TEXTILE PRODUCT

(71) Applicant: DSM IP Assets B.V., Heerlen (NL)

(72) Inventors: Michel Poul Tichelaar, Echt (NL); Chris Reutelingsperger, Echt (NL)

(73) Assignee: COVESTRO (NETHERLANDS) B.V., Nieuwegein (NL)

(*) Notice: Subject to any disclaimer, the term of this patent is extended or adjusted under 35 U.S.C. 154(b) by 13 days.

(21) Appl. No.: 16/312,584

(22) PCT Filed: Jun. 26, 2017

(86) PCT No.: PCT/EP2017/065734
§ 371 (c)(1),
(2) Date: Dec. 21, 2018

(87) PCT Pub. No.: WO2018/001977
PCT Pub. Date: Jan. 4, 2018

(65) Prior Publication Data
US 2019/0323172 A1 Oct. 24, 2019

(30) Foreign Application Priority Data
Jun. 27, 2016 (EP) .................................... 16176527

(51) Int. Cl.
*B32B 37/12* (2006.01)
*D05C 17/02* (2006.01)
(Continued)

(52) U.S. Cl.
CPC .......... *B32B 37/1284* (2013.01); *D05C 17/02* (2013.01); *D06N 7/0063* (2013.01);
(Continued)

(58) Field of Classification Search
CPC ............... D06N 7/0063; D06N 7/0078; D06N 2203/068; B32B 7/06; B32B 2037/1215;
(Continued)

(56) References Cited

U.S. PATENT DOCUMENTS

| 4,239,821 A | * | 12/1980 | McLean | B29C 44/467 |
| | | | | 427/358 |
| 2014/0134387 A1 | * | 5/2014 | Yamada | B32B 5/18 |
| | | | | 428/95 |

FOREIGN PATENT DOCUMENTS

| EP | 0 347 206 | 12/1989 |
| EP | 0 688 899 | 12/1995 |

(Continued)

OTHER PUBLICATIONS

International Search Report for PCT/EP2017/065734 dated Aug. 10, 2017, 8 pages.
(Continued)

*Primary Examiner* — John L Goff, II
(74) *Attorney, Agent, or Firm* — Nixon & Vanderhye P.C.

(57) ABSTRACT

The present invention pertains to a method to produce a laminated textile product, the product comprising a primary carrier sheet with yarns that form a pile on the front surface thereof, and a secondary carrier sheet adhered to the back surface of the primary carrier sheet, the method comprising providing a lick roller having a mass of molten polymer adhesive at its outer circumference, transporting the primary carrier sheet along the lick roller while its back surface is in contact with the outer circumference of the roller at a contact site, thereby transferring a layer of adhesive to the back surface of the primary carrier sheet, and bringing the secondary sheet in contact with the layer of adhesive to adhere the secondary sheet to the back surface of the primary carrier sheet to produce the laminated textile product, wherein downstream of the contact site between the primary carrier
(Continued)

sheet and the lick roller, before the secondary sheet is contacted with the layer of adhesive, cobwebbing of the adhesive between the primary carrier sheet and the lick roller is induced.

15 Claims, 3 Drawing Sheets

(51) Int. Cl.
    *D06N 7/00* (2006.01)
    *B32B 7/14* (2006.01)
    *B32B 37/06* (2006.01)

(52) U.S. Cl.
    CPC ............... *B32B 7/14* (2013.01); *B32B 37/06* (2013.01); *B32B 2037/1215* (2013.01); *B32B 2471/02* (2013.01); *D06N 2203/068* (2013.01)

(58) Field of Classification Search
    CPC ....... B32B 2471/02; B32B 7/14; B32B 37/06; B32B 37/0076; B32B 37/12; B32B 37/1284; B32B 37/1292; B32B 2037/123; D05C 17/02
    USPC ......................................... 428/85, 95, 96, 97
    See application file for complete search history.

(56) References Cited

FOREIGN PATENT DOCUMENTS

| | | | | |
|---|---|---|---|---|
| GB | 2076336 | 12/1981 | | |
| GB | 2140047 | 11/1984 | | |
| JP | 2625173 | 7/1997 | | |
| JP | 11-61067 | 3/1999 | | |
| JP | 3093312 | 10/2000 | | |
| WO | WO-9427738 A1 * | 12/1994 | ........... | B05C 1/0813 |
| WO | 2014/198731 | 12/2014 | | |
| WO | WO-2014198731 A1 * | 12/2014 | ........... | D06N 7/0076 |

OTHER PUBLICATIONS

Written Opinion of the ISA for PCT/EP2017/065734 dated Aug. 10, 2017, 7 pages.

* cited by examiner

METHOD TO PRODUCE A LAMINATED TEXTILE PRODUCT

This application is the U.S. national phase of International Application No. PCT/EP2017/065734 filed Jun. 26, 2017 which designated the U.S. and claims priority to EP 16176527.6 filed Jun. 27, 2016, the entire contents of each of which are hereby incorporated by reference.

GENERAL FIELD OF THE INVENTION

The invention in general pertains to a method to produce a laminated textile product, the product comprising a primary carrier sheet with yarns that form a pile on the front surface thereof, and a secondary carrier sheet adhered to the back surface of the primary carrier sheet, wherein the method comprises providing a lick roller having a mass of molten polymer adhesive at its outer circumference, transporting the primary carrier sheet along the lick roller while its back surface is in contact with the outer circumference of the roller at a contact site, thereby transferring a layer of adhesive to the back surface of the primary carrier sheet, and lastly bringing the secondary sheet in contact with the layer of adhesive to adhere the secondary sheet to the back surface of the primary carrier sheet to produce the laminated textile product.

BACKGROUND OF THE INVENTION

A method as described in the GENERAL FIELD OF THE INVENTION SECTION is known from WO2014/198731. This method pertains to a novel way of producing textile products, in particular carpet products (such as broadloom carpet, a carpet tile, a mat, rug, a runner etc.). Such products are typically used to cover floors, walls, interiors of cars, planes, boats etc. to provide a comfortable feel and pleasant look. Carpets typically comprise a primary carrier sheet (also called primary backing) having yarns stitched therein as a basic constituent. For example, most carpets are produced by tufting a polymer yarn (such as polyamide, polyester or polypropylene yarns) into a primary backing of felted polymer fibres to provide a pile of the polymer yarns protruding from a top surface of the primary carrier sheet (the face side of the carpet). At its back surface (opposite of the face side), the primary carrier sheet is typically provided with a polymer adhesive such as a latex, a cross-linkable polymer or a hot melt adhesive, for example to bind the yarns to the primary carrier sheet and/or to bind the primary carrier sheet to a secondary carrier sheet (also called secondary backing). Regarding the secondary backing, such a backing is typically used to improve mechanical properties such as dimensional stability of the carpet. The secondary backing can e.g. be a bituminous layer, a plastic sheet or a fibrous sheet comprising polymer yarns (such as a dense felted layer).

In the method as known from WO2014/198731 the primary carrier sheet is heat treated at its back to bond the yarns to the primary carrier sheet, after which a polymer adhesive is used at the back of the primary carrier sheet for bonding this sheet to a secondary backing to form a laminate. The polymer that is used as an adhesive is typically a low molecular weight material (Mw below 30,000 g/mol, thus below $3 \times 10^4$ g/mol, preferably above 1000 or even above 10,000 g/mol, typically between 15,000 and 30,000 g/mol), resulting in a rather low viscosity at 100-150° C., i.e. the typical operating temperature during lamination to enable applying the adhesive well below the melting temperature of the yarn material. The adhesive is applied via a lick roller (cf. roller 601 in FIG. 5 of WO2014/198731) to the back surface of the primary carrier sheet. Using such a roller is an adequate and simple way of transferring adhesive to the back of the primary carrier sheet to arrive at an adequate binding strength between the laminated layers. However, after arriving at an adequate laminating strength, the resulting carpet product does not always have an optimal feel. Also, durability of the binding between the laminated layers may be a problem.

OBJECT OF THE INVENTION

It is an object of the invention to provide an adequate laminating method that at least partly mitigates the disadvantages known from the prior art.

SUMMARY OF THE INVENTION

In order to meet the object of the invention, applicant has devised a method to produce a laminated textile product as described in the GENERAL FIELD OF THE INVENTION SECTION here above, wherein the method is improved in that downstream of the contact site between the primary carrier sheet and the lick roller, before the secondary sheet is contacted with the layer of adhesive, cobwebbing of the adhesive between the primary carrier sheet and the lick roller is induced.

The present invention is based on recognizing that applying adhesive on a textile product comprising yarns that form a pile, may inherently provide anomalies in the ultimate product. Firstly, applicant found that when the adhesive at the contact site between the lick roller and the primary carrier sheet is very low in viscosity, the adhesive may penetrate into the pile or along (through) the yarns to some extent. After cooling down, this may result in partial loss of a pleasant soft feel of the pile. Knowing that when using a lick roller a low viscosity is something a skilled practitioner strives for, this phenomenon is almost inherently arrived at when using a lick roller to apply the adhesive to the back of the primary carrier sheet, although the level of noticeable deterioration of the soft feel of a pile may vary from hardly noticeable tot very unpleasant. This depends i.a. on the type of pile (cut pile, loop pile, height of the pile, number of yarns per $m^2$), the type of yarns (type of polymer, thickness of the yarns, type of twine, etc), type of adhesive (viscosity at process temperature; type of polymer) and the type of use of the textile product (e.g. as a car mat, broadloom carpet in a living room, as a rug, covering of a wall etc). In the art, when the adhesive noticeably penetrates the pile, a common solution is to lower the temperature of the adhesive during application with the lick roller to make sure the viscosity is relatively high. This way, a very thick layer of adhesive which does not penetrate the pile is transferred to the primary carrier sheet. Commonly a knife is installed directly downstream of the site at which the primary carrier sheet is in contact with the roller, which knife will scrape off the superfluous adhesive form the back of the primary carrier sheet. Such a method however is leads to a relatively thick adhesive layer that is less durable. As is commonly known, the thicker a layer of polymer adhesive, the more prone the layer is to mechanical deterioration under stress.

Applicant found that these problems can at least partly be overcome when inducing cobwebbing of the adhesive between the primary carrier sheet and the lick roller directly downstream of the site at which the primary carrier sheet contacts the lick roller. Applicant found that there is a small intermediate area between the conditions wherein the viscosity of the adhesive is low, and the viscosity of the adhesive is high, wherein the viscosity is such that a row of multiple parallel strands (resembling the strands of a spider web) of the adhesive arises along the length of the lick roller, which strands extend between the back of the primary carrier sheet moving away from the lick roller and the lick roller itself. Under these conditions, apparently the viscosity of the adhesive is relatively high, thus leading to the formation of strands of adhesive that ultimately break when the primary carrier sheet moves further downstream, but not so high that a knife, doctor blade or other scraping element is needed to scrape off any superfluous amount of adhesive. It was found that in this small intermediate area the viscosity of the adhesive is high enough to prevent substantial penetration into the pile of the textile product, but low enough to prevent that a relatively thick layer of adhesive needs to be applied. Also, it may be that the structure of parallel strands of adhesive that is ultimately formed on the back of the primary carrier sheet (after the strands break) improves the durability of the bonding in the laminate, like the induction of parallel strands of adhesive by using a notched trowel in a layer of adhesive when adhering tiles to a wall or wooden planks to a floor. Still, in the latter application a totally different type of adhesive is used, viz. a ceramic-filled adhesive. It is surprising that cobwebbing appears to be advantageous for the current laminating process using a polymer adhesive, in particular since the art consequently teaches to avoid or reduce cobwebbing for this type of adhesives. See e.g. JP02625173B2 (published Jul. 2, 1997; Sumitomo 3M Ltd), JP03093312B2 (published Oct. 3, 2000; Nippon Synthetic Chem Ind Co) and JP11061067A (published Mar. 5, 1999; DuPont Mitsui Polychem Co Ltd).

It is noted that the adhesive does not need to meet particular properties to reach a state in which it is able to induce cob-webbing when using a lick-roller. This can be understood as follows: The basic forces that pull the strands out of the layer of adhesive downstream of the contact site between the sheet and the lick roller are pointed in the right direction when using a lick roller; It is a matter of using a process temperature at which the adhesive has a viscosity that falls in the window at which the row of strands will indeed appear. Below this window the viscosity is too thin to allow strands of adhesive to be pulled out of the layer of adhesive. Above this window the viscosity is too high to induce individual strands. At a viscosity which is too high the adhesive will split in the form of thick ribbon-like strands (width above 1 cm) which strands ultimately unite and take the width of the roller when the viscosity is further increased (hence the need of a knife for scraping of the excess adhesive when operating the process under these conditions). The breadth of the window, i.e. the operating window, will depend next to the process speed, mainly on the properties of the adhesive that may influence the viscosity at a certain temperature. Other factors such as the surface texture of the primary carrier sheet and lick-roller have less influence. Important adhesive properties are in particular the molecular weight (Mw) of the constituting molecules, the crystallinity, the substituents in the molecules (extra Vanderwaals forces or not), the type of molecules, whether or not there are cross-links between molecules, whether or not there are side chains and if yes, the number and type of side chains, etc. In practice this means that for some adhesives the operating window will be very small (in particular for the ones very low in molecular weight, and high in crystallinity), whereas for other adhesives the operating window will be somewhat larger (in particular for the ones with a relatively higher molecular weight, and low crystallinity). In particular, it has been found that a relatively broad operating window can be provided when using an adhesive, preferably a polyester adhesive, having a crystallinity between 5% and 35% and a viscosity of 5-55 Pa·s at 150° C. But again, the breadth of the window will also depend on the process speed and other process features as indicated here above.

Definitions

A textile product is a product that comprises textile (i.e. material made mainly of natural or artificial fibres, often referred to as thread or yarn), optionally with other components such as backing layers, carrier layers and/or adhesives. Textile products typically comprise an upper layer of pile attached to a backing (where the raised pile fibres are also denoted as the "nap" of the product), but may also be flat weave. Such products can be of various different constructions such as woven, needle felt, knotted, tufted and/or embroidered, though tufted products are the most common type. The pile may be cut (as in a plush carpet) or form loops (as in a Berber carpet).

A molten polymer adhesive is an adhesive in a state in which it can flow under the influence of gravity, as opposed to being in a solid state. It does not exclude that the viscosity is very high, or that the adhesive is in an amorphous state.

A lick roller is a rigid roll that turns into a fluid compound by which this compound is transported as a mass on the outer circumference of the roller towards a substrate to be coated with the compound, which substrate runs along a side of the turning roll.

Cob-webbing of an adhesive on a lick roller means the formation of a continuously present row of multiple parallel strands (fine strands or filaments, having a maximum typical width between 1-5 mm, and a minimum typical width around 1 µm, resembling the strands of a spider web) of the adhesive along the length of the lick roller, the strands extending perpendicular to the lick roller and having a macroscopic length and width (visible with the naked human eye). "Continuously present" in this sense means that during the process of adequately providing the adhesive with the lick roller (the "lick roller process") to a substrate, the web is continuously visible. Thus, during start-up, shut down or malfunctioning of the lick roller process, the web may not be present. In particular, the strands form a row of adjacent parallel strands having a length of at least 1 cm, further in particular at least 2, 3, 4 or 5 cm in length up to about 20 cm in length.

Fibrous means consisting basically out of fibres. The term "basically" in this respect means that the basic mechanical constitution is arranged out of fibres: the fibres may however be impregnated or otherwise treated or combined with a non-fibrous material such that the end material also comprises other constituents than fibres. Typical fibrous sheets are woven and non-woven (such as felted) textile products, or combinations thereof.

A sheet is a substantially two dimensional mass or material, i.e. broad and thin, typically, but not necessarily, rectangular in form, and inherently has two opposite surfaces.

Stitching is a method of mechanically making a yarn part of an object by stitches or as if with stitches, such as by tufting, knitting, sewing, weaving etc.

A layer is a thickness of material, laid on or spread over a surface. A layer may be inhomogeneous with respect to thickness and may be discontinuous in the sense that it may have holes in it.

A laminate is a structure comprising multiple stacked layers mechanically connected to each other.

A continuous sheet or web is a sheet having a length that is significantly longer than its width and having a minimum length of at least 1 meter, in particular at least 5, 10, 15, 20, 25, 30, 35, 40, 45, 50, 100 or even over 200 meters.

A woven material is a fabric material woven from yarns, fibres, tape or other thread like material.

A bowed roller, also called a "banana roller" or "spreader roller" is a roller having a curved stationary axle upon which a rotating sleeve(s) is mounted, typically over multiple bearing sets. The amount of bow is typically between 0.1 and 2% (height of the arc vs length of the roller).

Embodiments of the Invention

In a first embodiment of the method according to the invention the primary carrier sheet is a fibrous sheet with yarns stitched therein to form the pile on the front surface and loops of yarns at the back surface of the primary carrier sheet. In particular when using a fibrous sheet as the primary carrier (for example a felted, non-woven, sheet or a sheet woven of yarns or tape), the problem of penetration of the adhesive into the pile is hard to prevent when the viscosity of the adhesive is low. However, when operating the lick-roller under circumstances that induces cob-webbing of the adhesive (in particular at a suitable temperature and process speed), the problem of penetration into the pile may still be completely prevented or at least decreased to a level at which this penetration is hardly noticeable.

In a further embodiment the primary carrier sheet is heat treated to bond the yarns to the sheet by contacting the back surface of the primary carrier sheet with a surface of a hot body to at least partly melt the loops of the yarns to create a mass of molten yarn material at the back surface of the primary carrier sheet before the polymer adhesive is applied to this back surface. A method of heat treating the back of the primary carrier sheet with a hot body is known from WO2014/198731. It appears that the current method is very suitable in combination with this known method. This may be related to the type of surface texture of the back of the primary carrier sheet that arises by treating the back of this carrier this way. In yet a further embodiment the primary carrier sheet is heat treated by providing the surface of the hot body at a relative speed with respect to the back surface of the primary carrier sheet, in particular by providing the surface of the hot body as a stationary object, the primary carrier sheet being transported along the hot body.

In another embodiment the adhesive is transferred to the back surface of the primary carrier sheet at an amount of between 100 and 600 g/m$^2$. It appears that an amount as low as 100 g/m$^2$ may suffice in obtaining an adequate laminating strength. This is a good indication that the adhesive does not (substantially) penetrate into the pile. The upper amount of 600 g/m$^2$ is a preferred upper level. Above this amount the strands may become relatively thick and long which gives rise to an adhesive texture that is less favourable for use in a laminating process.

In still another embodiment wherein the primary carrier sheet is provided as a continuous web, guided over a guiding roller directly preceding the lick roller, the guiding roller is a bowed roller having its outer surface in contact with the pile. In the art it is known to guide a continuous primary carrier sheet to a laminating nip with its pile side being guided over at least one roller adjacent the nip (e.g. GB 2076336), in order to be able and apply adhesive to the back side of the primary carrier sheet with the lick roller. In order to prevent that the pile negatively influences a stable guidance of the primary carrier sheet, commonly a set-up is chosen wherein the primary carrier is sheet is guided by a complex steering nip consisting of multiple two rollers, the axis of which rollers can be adjusted with respect to the transport direction. Also, use is commonly made of a transport belt to further secure stable guidance. The reason for all this is that the transport of a running continuous web over a guide roller, with a pile directed to this roller, inevitably leads to a very strong tendency of the web to move laterally in one particular direction. To applicant's surprise, a bowed roller may be sufficient to stably guide the continuous primary carrier, with its pile against the roller, parallel to the process direction, not needing additional adjusting rollers, transporting webs, lateral guides or other running web adjusting means as known from the art.

In yet a further embodiment the adhesive has a viscosity of less than 500 Pa·s at 150° C. Since textile products are typically laminated below 200° C., preferably below 180° C. to prevent deterioration of the polymer pile yarns, it is advantageous that the adhesive is sufficiently low in viscosity at 150° C. to be able and find a operating window to induce cob-webbing at a temperature range below 180° C. There is no hard minimum value required for the viscosity at 150° C., but it is believed that a minimum viscosity of 1 Pa·s is practical. In a further embodiment the adhesive has a viscosity of between 1 and 100 Pa·s at 150° C., preferably between 5 and 70 Pa·s at 150° C., more preferably between 5 and 55 Pa·s at 150° C.

In again another embodiment the adhesive is semi-crystalline. By having a semi-crystalline adhesive, an adequate operating window may be found below 180° C. Partly crystalline adhesives typically have a narrower melting range which makes the control of the process easier. It is also believed that the quick crystallisation process improves the formation of the strands during in the cob-webbing process. A purely amorphous product has a higher resistance to forming multiple adjacent strands. In a further embodiment the adhesive has a crystallinity between 1 and 50%. Preferably the adhesive has a crystallinity between 5 and 35%, further in particular between 10 and 30%.

In yet again another embodiment the temperature of the polymer adhesive at the contact site is between 120° C. and 160° C.

Regarding the process speed, in an embodiment the transport speed of the primary carrier sheet with respect to the lick roller is at least 4 m/min. In a further embodiment the transport speed of the primary carrier sheet with respect to the lick roller is at least 10 m/min.

The invention will now be further explained using the following figures and examples.

EXAMPLES

Example 1 describes how to determine crystallinity of a polymer adhesive.

Example 2 describes how to determine viscosity of a polymer adhesive.

Example 3 describes an experiment assessing laminating strength in relation to induced cobwebbing.

FIG. 1

Figure 1:
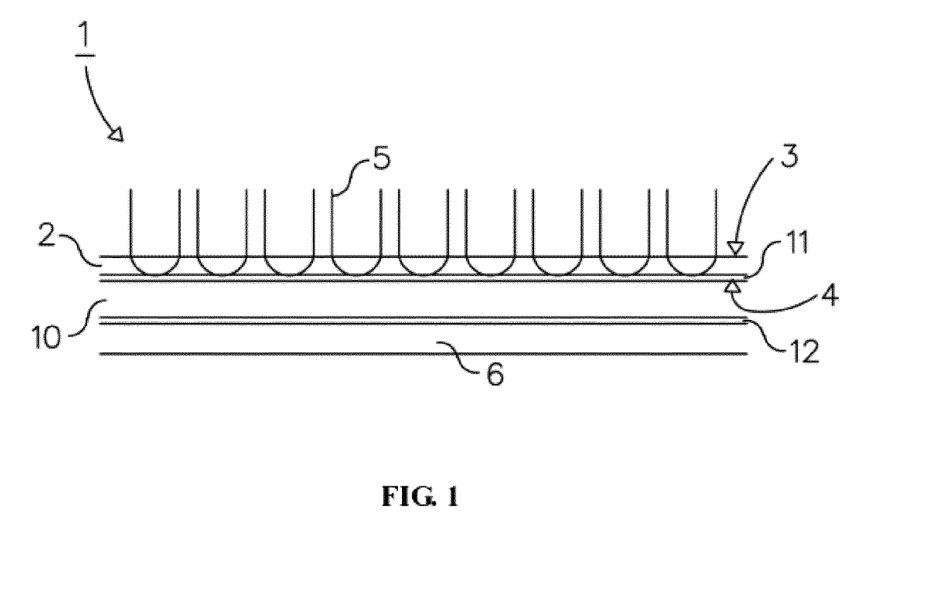
FIG. 1 schematically shows a cross section of a textile product manufactured according to the invention.

FIG. 1 is a schematic representation of respective layers of an embodiment of a laminated textile product 1 manufactured according to the invention, in this case a carpet tile. The tile comprises a primary carrier sheet 2, the so called primary backing, which is a tufted woven polyester backing. The polyester yarns 5 extend from the first surface 3 of this first sheet and are sealed to the second surface 4 of the sheet using the a yarn melting method as known from WO2014/198731. The weight of this primary sheet is typically about 400-700 g per m$^2$ (including tufted yarns). In order to provide sufficient mechanical stability for use as an end product such as a carpet tile, the product 1 comprises a primary backing sheet 6, in this case a polyester needle felt backing. The weight of this second sheet is typically about 500-1000 g/m$^2$. In between the first and second backing is an optional resilient layer 10 (which could for example be a polyester expansion fleece having a weight of 330 g/m$^2$, obtainable from TWE, Emsdetten, Germany as Abstandsvliesstof). The three layers (first and second backing and intermediate layer) are laminated together using a polymer adhesive, which may be a polyester hot melt glue as obtainable from DSM Coating Resins, Zwolle, the Netherlands, applied as layers 11 and 12 at a weight of about 250 g/m$^2$.

FIG. 2

Figure 2:
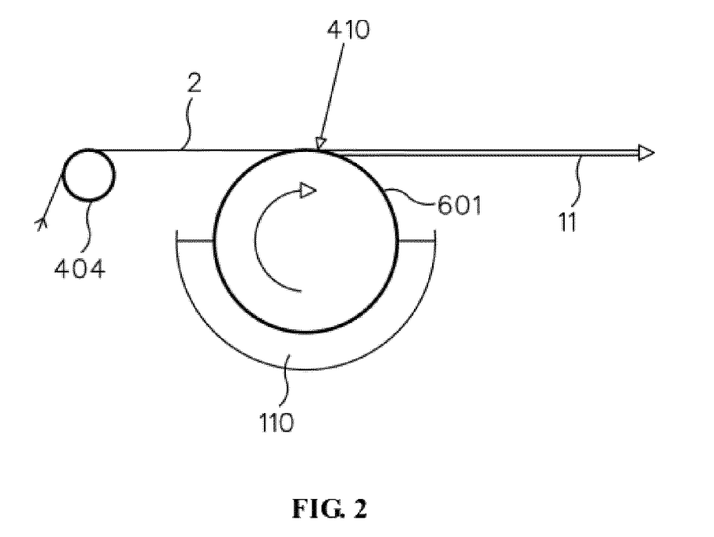
FIG. 2 schematically shows the principle of a coating process using a lick roller.

FIG. 2 schematically shows the principle of a coating process using a lick roller (also referred to as "kiss roll" in the art) 601. In this embodiment the lick roll comprises a metal coated basic drum that that turns into a fluid polymer adhesive 110, by which a layer of adhesive is formed on the outer circumference of the metal drum. The adhesive is transported towards the substrate 2 to be coated with a thin layer 11 of the adhesive 110. The substrate, in this case the primary backing sheet as depicted in FIG. 1, is supplied via roller 404 and runs along the upper side of the turning roll 601 and contacts the roll at contacting site 401. This site is actually a line that runs along the length of the roll 601 (see FIG. 3). In the art, at the exit of the lick roll (i.e. slightly downstream of the contact site 410) a knife is installed that will scrape off the superfluous coating from the substrate. The speed with which the substrate is introduced, the speed of the lick roll, their mutual contact pressure and surface area, the viscosity of the compounds, and the positioning of the optional squeegee (the knife) determine the final coating weight. Typically this weight varies between 20 and 1200 g/m$^2$. The roll may have a width up to about 4.20 meters such that common broadloom carpet can be made using this coating method.

FIG. 3

Figure 3:
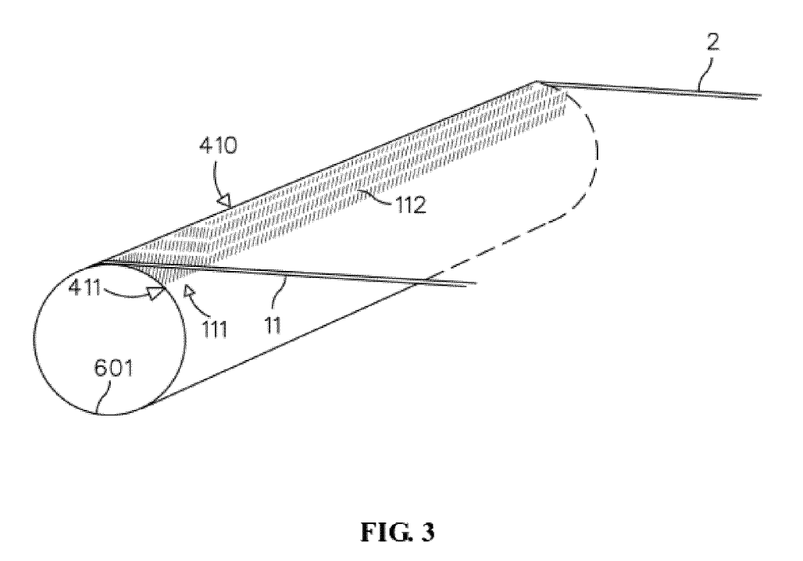
FIG. 3 schematically shows the phenomenon of cob-webbing in lick roller coating.

FIG. 3 schematically shows the phenomenon of cobwebbing in the lick roller coating process of FIG. 2. This front-side view shows the lick roller 601 in its length direction, in association with substrate 2. The contact site (line) 410 is indicated as well as thin layer 11 of the adhesive on the back of the substrate 2. Immediately downstream of the contact site 410 the phenomenon of cob-webbing is visualised, by schematically showing the row of fine strands 111 of adhesive that extend in a direction perpendicular to the longitudinal direction of the lick roller 601, between the layer 11 and the roll 601. This way, the strands form a row 112 over the length of the roller 601. At site 411 (which is a line that runs parallel to line 410) the strands are at their (average) maximum length and break. Partly they will adhere to the substrate 2 and form a texture of fine strands on the back of that substrate. Using a polymer adhesive as indicated here above in conjunction with FIG. 1, at a process speed of about 10 m/min, the strands typically have a thickness of about 20 μm, a length at break of about 10-15 cm (the point of breakage is approximately at the middle of the threads).

FIG. 4

Figure 4:
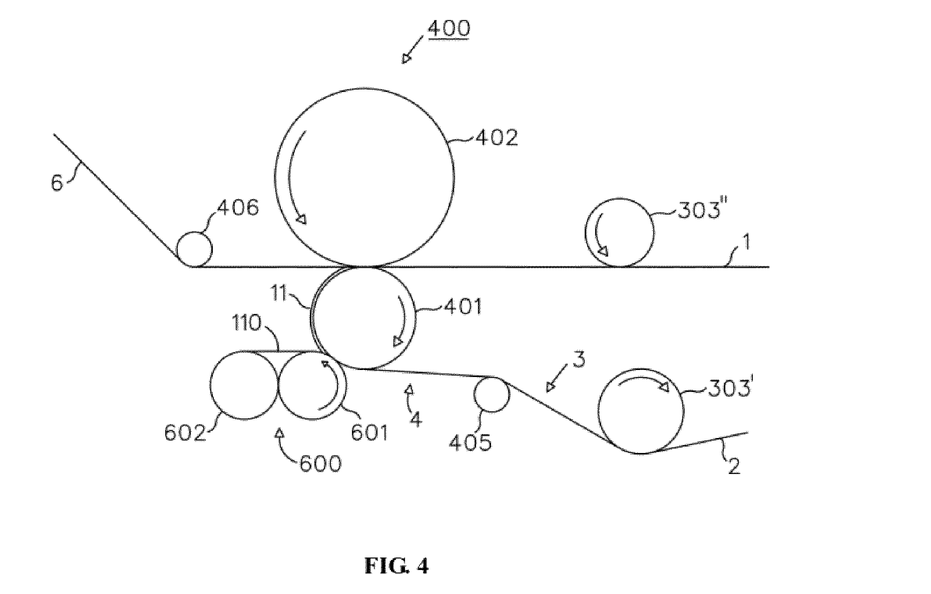
FIG. 4 schematically shows a laminating process incorporating cob-webbing.

FIG. 4 schematically shows a laminating station 400 for use in the present invention. The basic parts of the station consist of laminating rollers 401 and 402. These rollers form a nip wherein two separate layers, both typically conveyed to the nip in the form of a web, are laminated together, in this case using a hot melt adhesive 12 (see FIG. 1). The primary carrier sheet 2 enters the laminating station 400 while being guided with its upper (pile) surface 3 over a bowed roller 303'. The transport distance from this roller to the laminating nip, i.e. the length from the bowed roller to the laminating nip measured along the web 2, in this case is about 1.8 meters. Between the bowed roller 303' and the roller laminating 401 is an additional guide roller 405 positioned against the back of sheet 2. Right before entry of the laminating nip, the back side of the sheet 2 passes station 600, at which station the polymer adhesive 110 (in bulk) is metered via lick roller 601, in conjunction with roller 602, as a thin layer 11 to the back of sheet 2 at an amount of about 220 g/m$^2$. The tension in web 2 is typically between 600 and 3000 N, in this embodiment about 1000 N. Also entering the laminating nip is secondary backing sheet 6 (see FIG. 1) which enters the nip by guidance over roller 406 (which roller is optionally a bowed roller). Both sheets pass the nip while being laminated to each other to form carpet product 1. This product is guided to a further process station (not shown) over bowed roller 303". The tension in web 6 is typically between 200 and 600 N, in this embodiment about 400 N.

Example 1

Example 1 describes how to determine the crystallinity of a polymer adhesive. The determination is based on ASTM standard D3418 ("Standard Test Method for Transition Temperatures and Enthalpies of Fusion and Crystallization of Polymers by Differential Scanning calorimetry") using a Mettler STARe differential scanning calorimeter. For the actual measurement an adhesive sample of 10 mg is placed in a sample cup. This sample is kept in an oven for 15 minutes at 150° C. After this, the sample is cooled to 50° C. and then heated to 250° C. at a speed of 5° C./min. The sample is kept at 250° C. for 1 minute and thereafter directly cooled to 25° C. at a speed of 5° C./min. From the obtained DSC data the percentage of crystallinity in the sample polymer is calculated using the Mettler STARe SW 9.2 software.

For two polyester adhesives obtained via DSM Coating Resins, Zwolle, The Netherlands, which adhesives have excellent properties in order to obtain cobwebbing in the sense of the present invention, the crystallinity was determined this way. For the first polyester adhesive (denoted "A"), being a low molecular weight PET (Mw=18,704 g/mol) based on diethyleneglycol, butanediol, adipic acid and terephthalic acid, the crystallinity was 11%. For the other adhesive (denoted "B"), also a low molecular weight adhesive (Mw=25,541 g/mol), but being based on hexanediol and butanediol, next to adipic acid and terephthalic acid, the crystallinity was 15%.

In an alternative embodiment of the adhesive A, sebasic acid was used instead of adipic acid. This adhesive had a crystallinity of 14%. In another embodiment wherein as the alcohol component a mixture of ethanediol and hexanediol was reacted with terephthallic acid, the crystallinity arrived at was 26%. By varying the starting components and or relative amounts used, adequate adhesive could be obtained having a crystallinity between 5-35%, all having a low melt viscosity of about 5-55 Pa·s at 150° C. (established using a method as described under example 2).

Example 2

The viscosity of a polymer adhesive is measured by using a cone and plate viscometer (Brookfield CAP 2000+, available from Brookfield Ametek, Middleboro, Mass., USA) with a 24 mm diameter spindle and a cone angle of 1.8 degrees (Brookfield Cap 2000+ spindle #4). Samples are heated to 150° C. At 150° C. the spindle is lowered on the sample. The sample is measured at 21 rpm for 30 seconds. The viscosity is determined automatically by the viscometer's default algorithm. For the two adhesives (A and B) indicated here above under Example 1, the viscosities are 6.3 Pa·s and 27.1 Pa·s at 150° C. respectively. For the alternative adhesives mentioned in Example 1, viz. the adhesives having a crystallinity of 26% and 14%, the viscosity established this way was 28.2 Pa·s and 24 Pa·s respectively. These adhesives have an effective practical operating window for inducing cob-webbing.

Example 3

In this example an experiment assessing laminating strength in relation to induced cobwebbing is described. To assess the effect of cob-webbing on the lamination strength an experiment was conducted with one particular adhesive, but wherein the temperature of the adhesive at the lick roll was varied between 130° C., 140° C. and 150° C. and the process speed varied between 2 and 8 m/min. It was expected that in the experiments with the higher process speed, cob-webbing would be induced more easily. Indeed, at a process speed of 8 m/min, at each temperature cob-webbing was introduced. The lamination strength was tested manually and scored on a scale from 1 to 5. It was good at each temperature (4 or higher). There was clear cob-webbing in each case. At a process speed of 2 m/min, cob-webbing could not be noticed at a temperature of 150° C. (threads shorter than 1 cm). The laminating strength was scored with a 1, far too low for practical purposes. At a temperature of 140° C. cob-webbing was induced, and the laminating strength increased to 3. This is a reasonable score. At a temperature of 130° C. the cob-webbing phenomenon further increased showing as longer and thicker threads. The laminating strength however was still scored at 3.

The invention claimed is:

1. A method to produce a laminated textile product, the product comprising a primary carrier sheet, the primary carrier sheet having front and back surfaces with yarns that form a pile on the front surface thereof, and a secondary carrier sheet adhered to the back surface thereof, wherein the method comprises the steps of:
   (a) providing a lick roller having a mass of molten polymer adhesive at an outer circumference of the lick roller,
   (b) transporting the primary carrier sheet along the lick roller while the back surface thereof is in contact with the outer circumference of the lick roller at a contact site thereby transferring adhesive to the back surface of the primary carrier sheet,
   (c) inducing cobwebbing of the adhesive between the primary carrier sheet and the lick roller downstream of the contact site between the primary carrier sheet and the lick roller before the secondary sheet is contacted with the adhesive by forming a continuously present row of multiple parallel strands of the adhesive along a length of the lick roller with the strands extending perpendicular to the lick roller in a spider web-like fashion and having a macroscopic length and width,
   (d) breaking the strands of adhesive by moving the primary carrier sheet away from the lick roller to thereby cause separate strands of the adhesive to be present at the back surface of the primary carrier sheet, and
   (e) bringing the secondary sheet into contact with the separate strands of adhesive on the back surface of the primary carrier sheet to adhere the secondary sheet to the back surface of the primary carrier sheet and thereby produce the laminated textile product.

2. The method according to claim 1, wherein the primary carrier sheet is a fibrous sheet with yarns stitched therein to form the pile on the front surface and loops of yarns at the back surface of the primary carrier sheet.

3. The method according to claim 2, which further comprises heat treating the primary carrier sheet to bond the yarns to the primary carrier sheet by contacting the back surface of the primary carrier sheet with a surface of a hot body to at least partly melt the loops of the yarns to create a mass of molten yarn material at the back surface of the primary carrier sheet before the polymer adhesive is applied to the back surface.

4. The method according to claim 3, wherein the heat treating of the primary carrier sheet is practiced by providing the surface of the hot body at a relative speed with respect to the back surface of the primary carrier sheet.

5. The method according to claim 1, wherein the adhesive is transferred to the back surface of the primary carrier sheet in an amount between 100 and 600 g/m$^2$.

6. The method according to claim 1, further comprising guiding the primary carrier sheet as a continuous web over a guiding roller directly preceding the lick roller, wherein the guiding roller is a bowed roller having an outer roller surface in contact with the pile.

7. The method according to claim 1, wherein the adhesive has a viscosity of less than 500 Pa·s at 150° C.

8. The method according to claim 7, wherein the adhesive has a viscosity of between 1 and 100 Pa·s at 150° C.

9. The method according to claim 8, wherein the adhesive has a viscosity of between 5 and 55 Pa·s at 150° C.

10. The method according to claim 1, wherein the adhesive is semi-crystalline.

11. The method according to claim 10, wherein the adhesive has a crystallinity between 1 and 50%.

12. The method according to claim 11, wherein the adhesive has a crystallinity between 5 and 35%.

13. The method according to claim 1, wherein the temperature of the polymer adhesive at the contact site is between 120° C. and 160° C.

14. The method according to claim 1, wherein the transport speed of the primary carrier sheet with respect to the lick roller is at least 4 m/min.

15. The method according to claim 4, wherein the heat treating of the primary carrier sheet is practiced by providing the surface of the hot body as a stationary object and transporting the primary carrier sheet along the hot body.

* * * * *